United States Patent [19]

Pearman et al.

[11] Patent Number: 4,953,386

[45] Date of Patent: Sep. 4, 1990

[54] METHOD AND APPARATUS FOR PROVING ELECTRONIC GAS METERS

[75] Inventors: Arthur N. J. Pearman, St. Paul; Gerald D. Hunter, Lino Lakes; Robert E. Gilman, St. Michael; Michael A. Woessner, Golden Valley; Daniel T. Lyden, Minneapolis, all of Minn.

[73] Assignee: Gas Research Institute, Chicago, Ill.

[21] Appl. No.: 434,595

[22] Filed: Nov. 13, 1989

Related U.S. Application Data

[63] Continuation of Ser. No. 255,771, Oct. 11, 1988, abandoned.

[51] Int. Cl.$^5$ .............................................. G01F 25/00
[52] U.S. Cl. ................................................ 73/3; 364/510
[58] Field of Search ............................... 73/3; 364/510

[56] References Cited

U.S. PATENT DOCUMENTS

| | | | |
|---|---|---|---|
| 3,933,027 | 1/1976 | Mehall | 73/3 |
| 3,937,048 | 2/1976 | St. Clair et al. | 73/3 |
| 4,027,523 | 6/1977 | St. Clair | 73/3 |
| 4,566,307 | 1/1986 | Boykin | 73/3 |
| 4,685,324 | 8/1987 | Bourdon et al. | 73/3 |
| 4,700,568 | 10/1987 | Sleffel | 364/510 |

OTHER PUBLICATIONS

ON SET Computer Corp., "Tattletale Model III", Application Note, pp. 4, 5 and 10–11.
Hewlett Packard, "Quadrature Decoder/Counter Interface IC", HCTL-2000.

Primary Examiner—Tom Noland
Attorney, Agent, or Firm—Thomas W. Speckman; Douglas H. Pauley

[57] ABSTRACT

A method and apparatus for proving an electronic gas meter and the like that includes counting the number of pulses provided by an encoder associated with a bell prover to define a volume of test fluid which is supplied to the meter under test, enalbing the meter to measure the volumetric fluid flow rate and integrating the volumetric flow rate of test fluid measured by the gas meter during the test, and data representing the actual volume of test fluid supplied to the meter under test to determine the percent proof or accuracy of the meter.

12 Claims, 5 Drawing Sheets

METHOD AND APPARATUS FOR PROVING ELECTRONIC GAS METERS

CROSS REFERENCE TO RELATED APPLICATION

This application is a continuation of application Ser. No. 255,771, filed Oct. 11, 1988 which is now abandoned.

BACKGROUND OF THE INVENTION

This invention relates to a method and apparatus for proving fluid flow meters, such as gas meters and the like.

Gas meters presently employed by the gas utility industry are mechanical meters of the double bellows type. Such meters are proven using apparatus commonly referred to as a bell prover system. In such a system, a copper bell of accurate dimension is allowed to descend at a constant rate into a tank of light oil or water As the bell descends, a suitable test fluid, typically air or natural gas, is passed through the meter under test. The volume of air or natural gas which is passed through the meter is determined by the amount of linear movement of the bell. The position of the bell accurately defines the volume of test fluid which has been passed through the meter under test.

Typically, in proving gas meters using bell prover systems, a source of air or natural gas is connected to the meter under test and the flow rate of the gas meter is adjusted by selecting a suitable orifice which is connected in series with the source of test fluid and the meter under test. With the flow rate of the gas meter set, the proof run is initiated. With gas meters presently available, initiation of a proof run is effected by interrupting a light source using the calibration dial of the meter. At the start of the proof run, the test fluid supply is switched rapidly to the bell. After one cubic foot of the test fluid has passed through the meter of the test and the bell, the light source is interrupted because the calibration dial has registered one complete revolution. When the light source is again interrupted, the fluid outlet of the bell is closed off, terminating the supply of the test fluid to the meter.

The position of the bell is then accurately recorded electronically, yielding the exact amount of the test fluid that has passed through the meter under test during the time it recorded passage of one cubic foot of fluid as indicated by the calibration dial of the meter. From this measurement, the accuracy or proof of the meter can be calculated. The information obtained can be used to adjust the mechanical mechanism of a meter that fails the proof test.

In the co-pending U.S. patent application Ser. No. 140,714 of Pearman et al, which is entitled ELECTRONIC GAS METER, and which is assigned to the assignee of this application, there is disclosed a gas meter which includes a solid state sensor and solid state signal processing circuits for measuring gas flow volume. This gas meter does not have a calibration dial available for controlling a proof test in a manner similar to mechanical meters of the double bellows type as described above. Also, the meter does not have a mechanical adjustment to improve its accuracy. Thus, proof test techniques and calibration adjustments heretofore used for mechanical gas meters cannot be used on electronic gas meters of this type.

Moreover, the meter circuitry is powered from a battery. In order to conserve battery energy, a sampling technique is used by the gas meter, and the meter circuitry includes a timing function which defines meter operating cycles, the solid state sensor and associated processing circuits being energized only during a portion of each meter operating cycle for as much time as is necessary to maintain an accurate measurement of volumetric gas flow through the meter. The circuitry is energized during active periods or sampling intervals when flow measurements are conducted. The meter circuitry is held inactive for the balance of the meter operating cycle. The meter circuitry is not continuously measuring gas flow, but rather operates to average flow sample signals produced during successive operating cycles to provide flow measurement data. Accordingly, at any instant of time, the value of gas volume that has flowed through the meter, as recorded in a solid state memory of the meter, may be in error by the amount of time that the gas was flowing but that the meter system was maintained inactive. By way of example, this error may be as large as 1/18 of a cubic foot at any instant of time at the maximum flow rate. However, this error becomes zero each time that the meter becomes active and records the latest data.

Thus, it would be desirable to have a method and apparatus for proving a fluid flow meter of the type incorporating solid state sensing and signal processing circuits.

It would also be desirable to have a method and apparatus for proving a fluid flow meter of the type which operates in active and sleep modes, and which method and apparatus substantially eliminates error in the measurement of fluid flow volume through the meter during a proving test operation.

SUMMARY OF THE INVENTION

It is an object of the present invention to provide a new and improved method and apparatus for proving fluid flow meters and the like.

Another object of the invention is to provide a method and apparatus for proving fluid flow meters of the type employing a solid state sensor and signal processing circuits for measuring gas volumetric flow.

Yet another object of the invention is to provide a method and apparatus for proving fluid flow meters of the type including solid state sensing and signal processing circuits which operate in successive active and inactive modes, and which method and apparatus minimize or substantially eliminate error in fluid flow measurement through the meter during the proving operation.

These and other objects are achieved by the present invention which has provided a method and apparatus for proving a fluid flow meter of the type including a solid state sensor and signal processing circuit for measuring gas volume flow.

In accordance with one aspect of the invention, there is provided a method for proof testing of a gaseous fluid flow meter and the like comprising supplying to the meter under test a volume of a gaseous test fluid using a volume measurement standard apparatus, enabling the meter under test to conduct fluid flow measurements to provide measurement data representing the volume of test fluid measured by the meter in response to fluid flow through the meter during a test, generating a plurality of electrical pulses, the number of pulses generated being indicative of the actual volume of the test fluid which is passed through the meter during the test fluid which is passed through the meter during the test, registering in a pulse counter the electrical pulses generated, providing an indication when the number of pulses registered by the pulse counter is indicative of a preselected volume of test fluid having been passed through the meter under test, causing the test to be ended when such indication is provided, and correlating measurement data provided by the meter indicative of the volume of test fluid which is measured by the meter during the test interval with data representing the count registered by the pulse counter indicative of the actual volume of the test fluid passed through the meter for proving the operation of the meter.

In accordance with another aspect of the invention, there is provided an apparatus for proof testing of a gaseous fluid flow meter and the like comprising means including a volume measurement standard apparatus for supplying to the meter under test a volume of a gaseous test fluid, processing means for enabling the meter under test to provide volume flow measurement data representing the volume of test fluid measured by the meter in response to fluid flow through the meter, pulse generating means for generating a plurality of electrical pulses, the number of pulses generated being indicative of the actual volume of the test fluid which is passed through the meter during a test, pulse counting means for registering the electrical pulses generated during the test, said processing means responding to said pulse counting means to cause the test to be terminated when the pulse counting means to cause the test to be terminal when the pulse counting means has registered a preselected number of pulses indicative of a preselected volume of test fluid having been passed through the meter under test, said processing means correlating measurement data provided by the meter indicative of the volume of test fluid which is measured by the meter during said test with data representing the count registered by said pulse counting means indicative of the actual volume of the test fluid passed through the meter for proving the operation of the meter.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a simplified representation of apparatus provided in accordance with the present invention for proving a fluid flow meter and the like;

DESCRIPTION OF A PREFERRED EMBODIMENT

Figure 1:
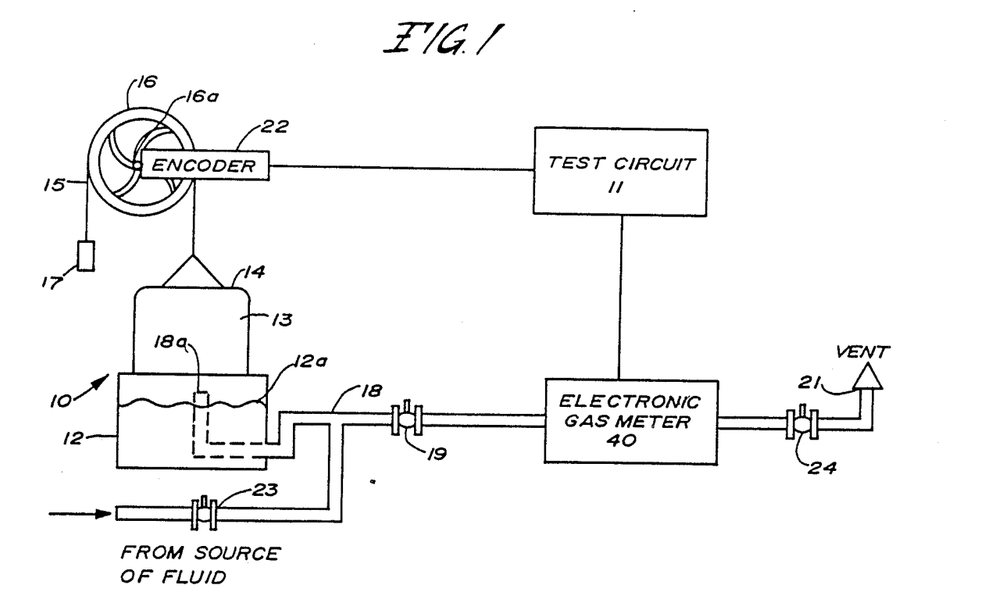

Referring to FIG. 1, there is illustrated a bell prover test type apparatus 10 having an associated test circuit 11 provided in accordance with the present invention for proving a fluid flow meter, and in particular an electronic gas meter 40 of the type disclosed in pending U.S. patent application Ser. No. 140,714 of Pearman et al, which is entitled ELECTRONIC GAS METER, and which is assigned to the assignee of this application. As fully described in such patent application, the electronic gas meter includes a solid state sensor and solid state processing circuits which employ a sampling technique to register volumetric gas flow through the meter. The meter circuitry includes a timer operable when enabled to generate cycle timing pulses which define operating cycles for the meter. Each operating cycle includes an active period and an inactive period. The gas flow measurement is conducted during the active periods, using a sampling technique in which a number of samples are obtained and averaged to provide a meter. A sliding window averaging technique is used in which the newest sample value obtained replaces the oldest sample value previously obtained.

The bell prover test apparatus 10 includes a conventional test fluid tank 12, and a bell 13 having a closed top 14 which is connected to one end of a cable 15 which passes over a pulley 16 and having its other end connected to a counter weight 17.

The bell 13 is mounted for guided vertical movement within the tank 12, which is filled with water or light oil to a level 12a. The interior of the bell 13 is communicated with the outlet end 18a of a fluid pipeline 18 which is connected to the meter through a flow rate control valve 19 and upstream of the meter 40, and through a fill or supply valve 23 to a fluid supply. The outlet end 18a of the pipeline 18 is located above the level 12a of the medium within the tank. Test fluid, typically air or natural gas, is admitted to the interior of the bell from the fluid supply through the supply valve. In the embodiment described herein, the test fluid is assumed to be air, and such air is evacuated from the bell and passed through the gas meter 40 under test during the proof test.

The bell 13 is allowed to fall at a constant rate into the tank 12 causing the air contained therein to flow through the pipeline 18, the flow control valve 19 and through the meter 40 and to be exhausted through a start valve 24 downstream of the meter to a vent 21 at the outlet of the meter 40. The bell is guided in its vertical movement in a manner known in the art of meter proving.

For the purpose of monitoring the position of the bell 13, and thus the volume of air that has passed through the gas meter 40 during a test cycle, a shaft encoder 22 is associated with the shaft 16a of the pulley 16. The encoder 22 provides a known number of pulse outputs to the test circuit 11 for each known volume, such as 4292 pulses per cubic foot.

Figure 2:
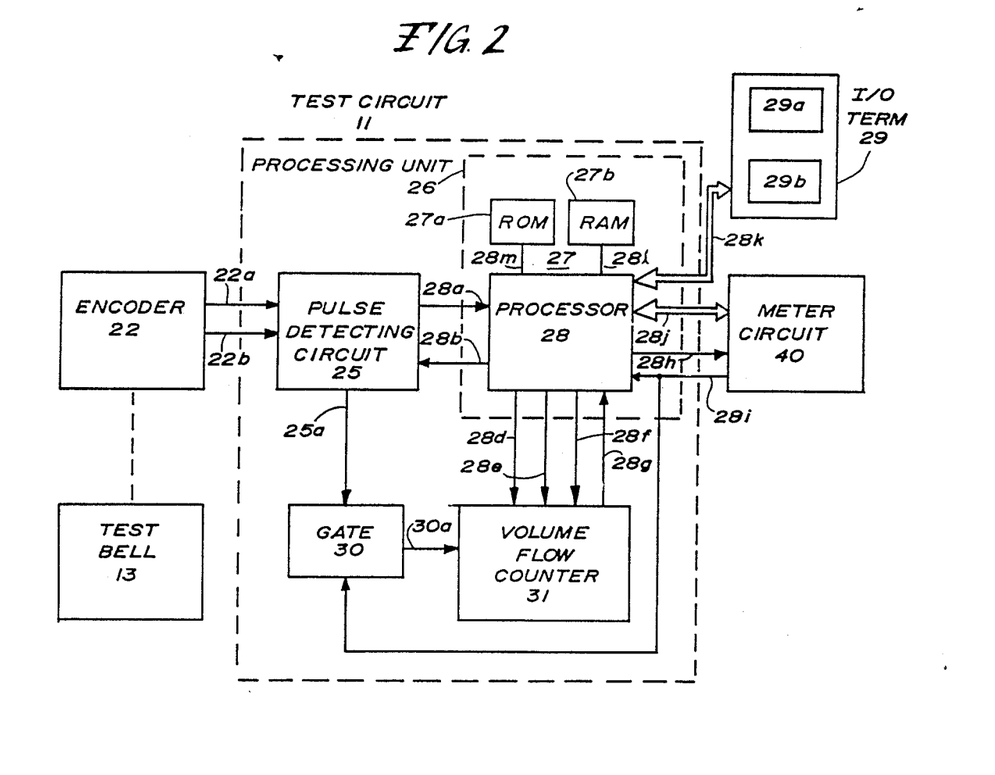
FIG. 2 is a block diagram of the apparatus shown in FIG. 1 but illustrating additional details as to the test circuit.

As will be shown, during the proof test, the meter flow rate is measured by passing an arbitrary volume of test fluid through the meter, and enabling the circuit 41 of the meter to measure volumetric flow rate through the meter. The actual volume of test fluid being passed through the meter is determined by the test bell and a volume flow counter 31 (FIG. 2). In accordance with one aspect of the invention, the proof test is initiated through the test circuit by the operator, and after a short delay period during which the rate of descent of the test bell is stabilized, and the meter sliding window average is updated, control of the proof test is transferred automatically to the meter circuit 41. At the next rising edge of a signal which defines the meter sample period, the meter starts the proof test allowing the shaft encoder pulses to be recorded in the volume flow counter and the meter sliding average volume flow rate to be recorded in an accumulating memory 66-ACC (FIG. 3) of the meter circuit 41. At the next successive meter sample rising edge after the test electronics has recorded a known volume of test fluid, 1 cubic foot for instance, the meter stops the proof test and transfers control back to the test electronics. The test circuit 11 then determines the actual volume of test fluid which has passed through the meter during the proof test and compares this with the fluid flow measured by the meter during the proof test to determine the percent proof.

Referring to FIG. 2, the test circuit 11 includes a pulse detecting circuit 25, a gate circuit 30, a volume flow counter 31 and a processing circuit 26. The processing circuit 26 includes a processor 28 and a memory circuit 27 including a fixed memory or ROM 27a for storing the operating program for the processor 28, and a variable memory or RAM 27b for storing data. The processor has programmable inputs/outputs 28a, 28b and 28d through 28m. The pulse detecting circuit 25 has inputs connected to the outputs 22a and 22b of the encoder 22, an output for providing a 2 cubic foot ENABLE signal to the input 28a of the processor 28, and an input connected to output 28b of the processor for receiving a signal RESET. The pulse detecting circuit 25 has a further output 25a connected to an input of the gate circuit 30 for providing count pulses from pulse detecting circuit to the gate circuit 30. The output 30a of the gate circuit 30 is connected to an input of the volume flow counter 31. The gate circuit 30 has an input 30b connected to an input 28i of the processor 28 and to an output of the meter circuit 41 to receive START/COUNT ENABLE signal provided by the meter circuit 41. The processor has an output 28h connected to an input of the meter circuit 41 for applying signal PROOF ENABLE thereto.

The processor 28 has programmable input/outputs 28d–28g which interface the processor 28 with the volume flow counter 31. Input 28d extends clock pulses to the volume flow counter. Input 28e extends a signal LATCH to the volume flow counter. Input 28f extends a signal COUNTER RESET to the volume flow counter. Output 28g extends data representing the count of the counter 31 to the processor. The processor 28 has a serial port 28j including an RS232 module which interfaces the processor 28 with the meter circuit 41, and a serial data port 28k including an RS232 module which interfaces the processor 28 with the input/output terminal 29.

Briefly, the pulse detecting circuit 25 counts the pulses generated by the encoder 22 as the test bell descends. At the start of the proof test, the processor 28 monitors the output of the pulse detecting circuit 25. Upon reaching a preselected count, which may be 8448, for example, and is indicative that the test bell is descending at a substantially constant rate and has reached the 2 cubic foot mark, the pulse detecting circuit 25 generates a 2 cubic foot ENABLE signal (FIG. 5, line E), on output 28a which is applied to the processor which responsively generates a PROOF ENABLE signal (FIG. 5, line G) which is applied via output 28h to the meter circuit 41 enabling the meter circuit 41 to assume control of the proof test. When the meter sample period next rising edge occurs (FIG. 5, line H), START/COUNT ENABLE signal (FIG. 5, line I) generated by the meter circuit 41 enables gate 30 to permit pulses from the pulse detecting circuit 25 to be passed through the gate 30 to output 30a to the volume flow counter 31. The meter circuit 41 then takes readings and stores data representing the readings in an accumulating memory 66-ACC (FIG. 3) of the meter circuit 41. The accumulating memory 66-ACC may be cleared at the start of a proof test or the value initially stored may be obtained by the processor 28 at the start of the proof test.

When the volume flow counter 31 registers a count of 4292, indicative that the three-foot mark, for instance, (4292 counts since the two-foot mark) has been reached, the processor 28 terminates the signal PROOF ENABLE (FIG. 5, line G) on its output 28h to the meter circuit 41. Then, on the next sampling interval leading edge (FIG. 5, line H), the meter circuit 41 terminates the signal START/COUNT ENABLE (FIG. 5, line I) to the processor input 28i and to the gate 30, thereby stopping the proof test. The processor 28 responsively reads the count registered by the volume flow counter 31 via programmable input/output lines 28d,e,g which is indicative of the actual volume of the test fluid which has passed through the meter 40 and compares this information with the meter reading information stored by the meter circuit 41 during proof test. The processor 28 reads this data via serial data link 28j which is connected to the meter circuit 41, and compares the meter reading data with that obtained from the volume counter 31 to determine the percent proof or accuracy for the meter 40. Because the sample interval pulses (FIG. 5, line H) are used in starting and stopping the volume flow counter 31, the actual volume measurement is indexed to the meter sampling periods, thus eliminating any error which might otherwise occur because the meter does not continuously measure gas flow. Such error becomes zero each time that the meter becomes active and records the latest data.

The input/output terminal 29 is connected to the processor 28 through serial link 28k. Input/output terminal 29 includes a keyboard 29a which enables the user to input start commands to the processor 28 to start the proof test. The input/output terminal 29 may also include a suitable display 29b, such as a cathode ray tube or liquid crystal display for displaying the results of the proof test.

Figure 3:
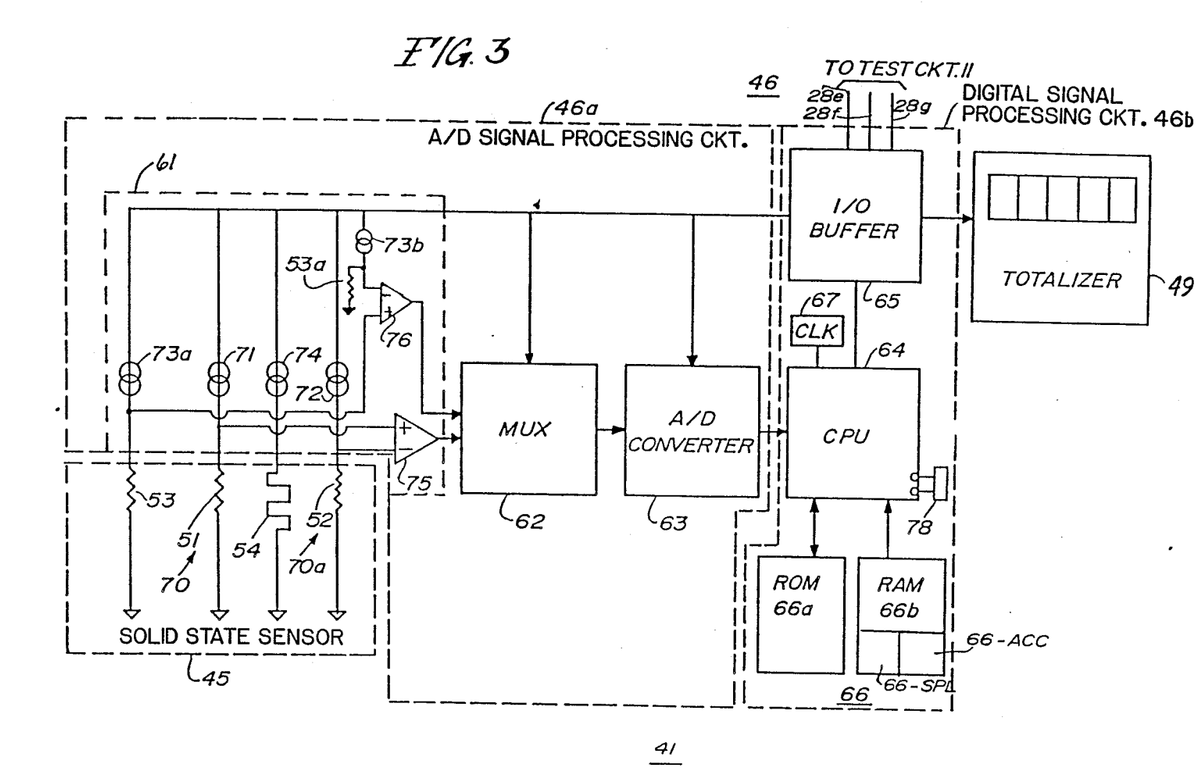
FIG. 3 is a block diagram of circuits of a fluid flow meter proven by the apparatus provided by the present invention.

Considering the meter in more detail, referring to FIG. 3, as is described in the referenced patent application, the electronic gas meter 40 includes a solid state sensor 45, electronic signal processing circuits 46, including an analog-to-digital signal processing circuit 46a and a digital signal processing circuit 46b, and an indicating device 49 which provides a digital read out of the quantum of fluid measured by the meter 40.

The solid state sensor 45 provides a signal output indicative of the fluid flow rate through the meter. The electronic signal processing circuits 46 sample the signal output of the flow sensor 45 periodically and generate a signal indicative of the volume flow rate measured by the meter over a given time period. This signal is applied to the indicating device 49 which records a reading representative of the cumulative fluid volume flow rate measured by the meter. The flow sensor and electronic circuits of the meter are battery-powered and include low-energy consuming elements which are operated in a manner so as to conserve the battery life. For example, the electronic circuits operate in an active mode during which the sampling operation is done and a sleep mode during which the flow sensor 45 is deenergized and the electronic circuits 46 are maintained at minimum energy usage.

The analog-to-digital signal processing circuit 46a includes a drive and signal acquisition circuit 61, a multiplexing circuit 62, and an analog-to-digital converter 63. The digital signal processing circuit 46b includes a microprocessor system which includes a central processing unit CPU 64, an input/output buffer 65, memory circuits 66, and a real time clock 67. Memory circuits 66 include fixed memory or ROM 66a and variable memory or RAM 66b which further comprises a sample memory 66-SPL and an accumulative memory 66-ACC.

The flow sensor 45 corresponds to the solid state sensor described in U.S. Pat. No. 4,651,564, and the construction, configuration and operation of the solid state sensor is described in detail in the U.S. Pat. No. 4,6541,564, and accordingly will not be described in detail herein.

The temperature sensors 51 and 52 of the solid state flow sensor 45 are connected in arms 70 and 70a of a bridge network, the sensors 51 and 52 being energized by current supplied by respective constant current sources 71 and 72. The heater resistor 54 is energized by a further constant current source 74 and the reference temperature sensor 53 is driven by a constant current source 73a. The temperature sensor's other bridge leg is driven by constant current source 73b. The five constant current sources 71, 72, 73a, 73b and 74 are not continuously energized but are only energized during sampling intervals defined by timing pulses (FIG. 5, line H), produced by the central processing unit 64 as will be shown.

The junction temperature sensors 51 and 52 are connected to the non-inverting and inverting inputs, respectively of a differential amplifier 75, the output of which is extended to the multiplexer 62. Reference temperature sensor 53 of the flow sensor 45 and the other bridge leg of the temperature sensor, which includes resistor 53a, are connected to the non-inverting and inverting inputs respectively of differential amplifier 76, the output of which is extended to multiplexer 62. The multiplexer circuit 62 operates under the control of the central processing unit 64 to selectively extend to the analog-to-digital converter circuit 63 the outputs of the differential amplifiers 75 and 76, representing the flow rate of the air measured by the meter 40 and the reference temperature provided by temperature sensor 53. As indicated, the reference temperature reading is sampled less frequently than the flow rate signal provided by the differential amplifier 75.

The analog-to-digital converter circuit 63 receives the output extended thereto from the multiplexer circuit 62 and converts this output signal into a digital signal, which signal is applied to the central processing unit 64. The central processing unit 64 operates under program control to execute the operations necessary to effect the periodic readout of the information provided by the flow sensor, to enable the analog-to-digital converter circuit 63 to receive this information, to read this information from the output of the analog-to-digital converter 63 and to calculate the fluid flow rate.

As described in the referenced application measured flow rate is calculated from a plurality "k" of samples obtained through periodic interrogation of the flow sensor 45, using a "sliding window" method in which data representing the newest sample is entered into the memory and the data representing the oldest sample is removed from the memory. For example, thirty-two samples of flow rate data stored in the sample memory 66-SPL and averaged over the time interval for which the samples are obtained. The flow rate values obtained for each reading taken during the test are stored in the accumulative memory 66-ACC of the meter processing unit. That is, the readings are added together to provide stored data representing the total volumetric flow.

The central processing unit 64 through input/output drivers 65 supplies the current meter flow rate information to the indicating device 49 and supplies commands to the analog-to-digital circuit 46a to effect the sensor sampling procedure. A jumper 78 is used to effect a hardware connection of terminals of the processor 64 enabling software routines for the proof test mode.

Figure 4:
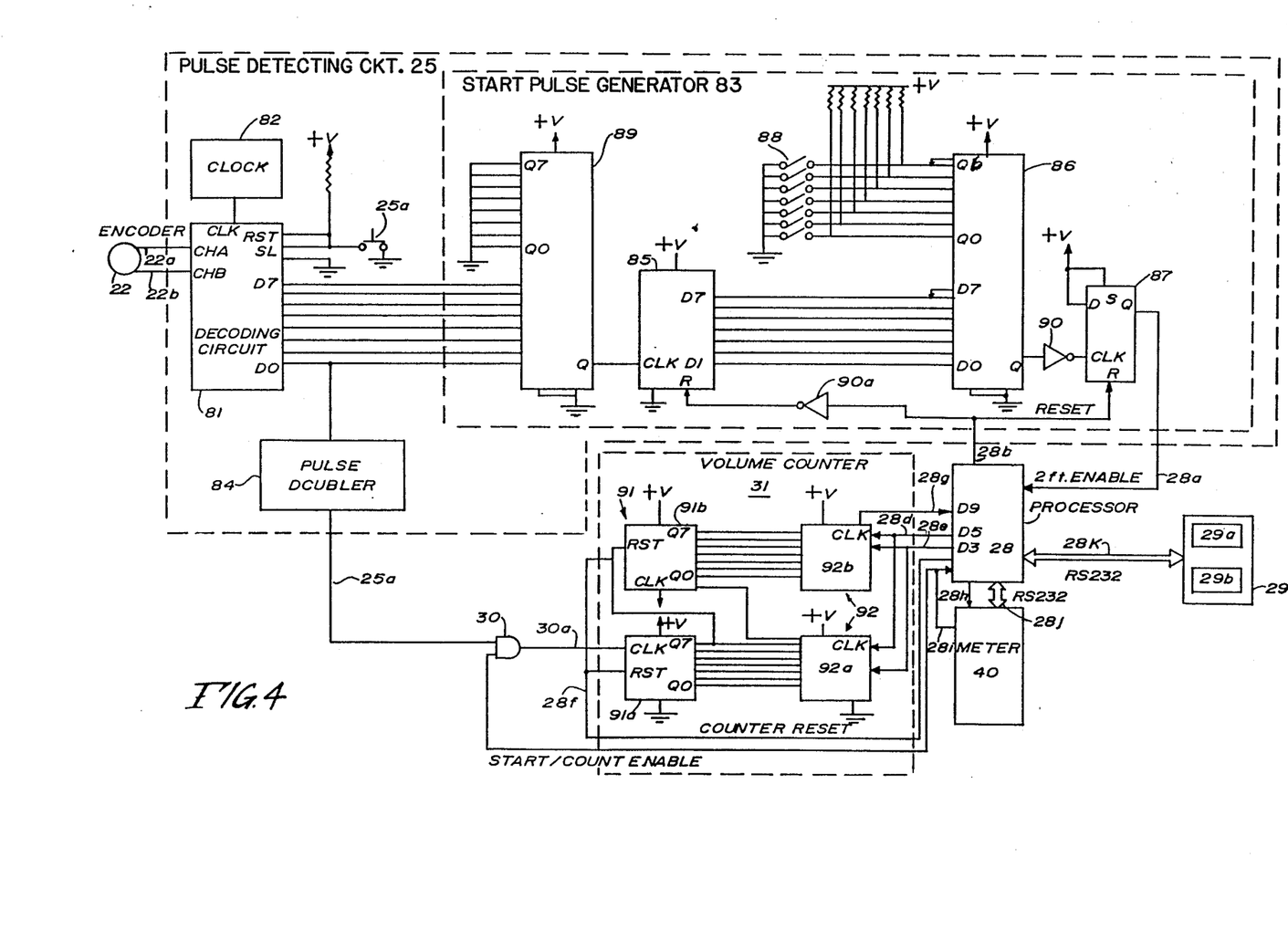
FIG. 4 is a partial block and schematic circuit diagram of a pulse detecting circuit of the test circuit.

Considering the test circuit 11 of FIG. 2 in more detail, with reference to FIG. 4, the pulse detecting circuit 25 includes a decoding circuit 81, a clock circuit 82, a start pulse generator 83, and a pulse doubler circuit 84. Decoding circuit 81 has inputs CHA and CHB connected to outputs 22A and 22B of the encoder 22, a clock input CLK connected to the output of the clock circuit 82 to receive timing pulses for sequencing the operation of the decoding circuit 81. The decoding circuit 81 has a reset input RST normally held at logic level high. A normally open switch 25a, when operated, enables the reset input for resetting the decoding circuit. The decoding circuit 81 also has eight outputs D0-D7 which are extended to the start pulse generator 83.

The start pulse generator 83 includes a comparator circuit 89, a counter 85, a comparator circuit 86, a data latch 87 and inverters 90 and 90a. Comparator circuit 89 has one set of eight inputs D0-D7 connected to the outputs D0-D7 of the decoding circuit 81. The comparator circuit 89 has a second set of inputs Q0-Q7 commonly connected to ground. The comparator circuit 89 is connected to provide an output signal for each 256 pulses generated by the encoder and supplied to the comparator circuit 89 by the decoding circuit 81.

Counter 85 has its clock input CLK connected to the output of the comparator circuit 89 and its count increments by one for each 256 counts of the decoding circuit 81.

The comparator circuit 86 has a first set of inputs D0-D6 connected to the outputs D1-D7 of counter 85 and a second set of inputs Q0-Q6 programmed by the setting of switches 88 such that the comparator circuit 86 generates an output each time the number of pulses generated by the encoder reaches 8448 (33×256). This output is extended through an inverter 90 as the CLK pulse to the data latch 87, setting the data latch which outputs a 2 cubic foot ENABLE signal.

The lowest order bit output D0 of the decoder 81 is extended to the pulse doubler circuit 84, the output of which is connected to one input of gate circuit 30. Gate circuit 30 has a second input connected to an output of the meter circuit 40 to receive the START COUNT ENABLE signal. The output 30a of gate 30 is connected to an input of the volume flow counter 31.

The volume flow counter 31 comprises a two-stage counter 91 including counter stages 91a and 91b and a 14-bit parallel-to-serial converter 92. The counters 91a and 91b are connected in series such that counter 91b is stepped each time counter 91a rolls over. Each of the counters 91a and 91b are seven-bit counters and the seven outputs of the two counters are extended to the fourteen inputs of the parallel-to-serial converter circuit 92. The parallel-to-serial converter circuit 92 enables the count registered by the counter 91 and applied to be read out serially and extended over lines 28d,e,g to the processor 28 under the control of the processor.

The switch 25a is manually operable by the user to generate a reset pulse for the decoder 81 of the pulse generating circuit 25 at the start of a proof test. The reset function for the start pulse generator, including the 7-bit counter 85 and the data latch 87, is provided by the processor 28 under program control when the proof test procedure is initiated by the user.

By way of example, the decoder 81 may be the type HCTL 2000 Quad Decoder commercially available from Hewlett Packard. The comparator circuits 84 and 86 may comprise the Type 74HC688 8-bit comparator commercially available from National Semiconducter. The 7-bit counters 85, 91a and 91b may be the Type 4024 commercially available from Motorola. The processing unit 26 may comprise the processing system commercially available as the TATTLETALE MODEL II from Onset Computer Corp. of Falmouth, Mass.

Test Sequence of Operation

Figure 6:
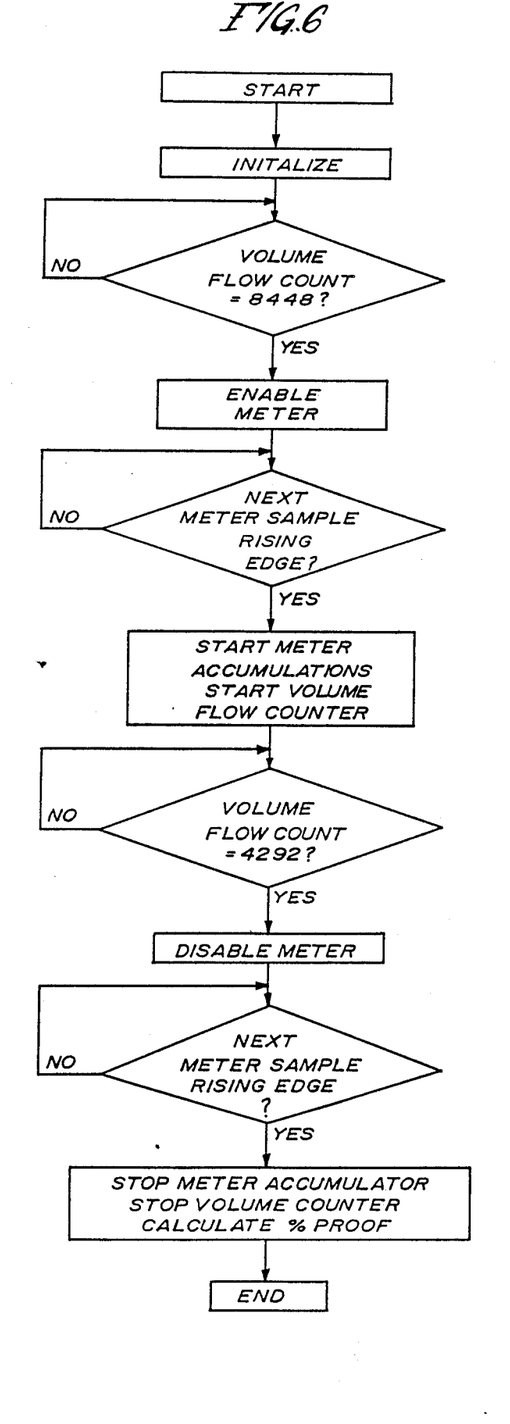
FIG. 6 is a process flow chart illustrating operation of the test circuits.

Referring to FIGS. 1, 2 and 4 and the process flow which comprises FIG. 6, the test apparatus is set up as shown in FIG. 1 with the electronic gas meter 40 to be proven installed on the test stand. The jumper 78 (FIG. 3) is set to enable the proof test software routines in the meter processor software. The test bell 13 is positioned at the highest position and the fill valve 23 is opened, with rate valve 19 closed, to fill the bell with test air. The fill valve 23 is closed when the bell 13 is filled. Then the flow rate control valve 19 is adjusted to the initial fluid flow rate, normally 100%. Conventionally in a proof test, two test runs are used, one test run at 100% maximum flow rate and the other test run at a lower rate, typically 30% maximum flow rate.

The bell is raised to the zero position. Then reset switch 25a (FIG. 4) is operated to reset the decoder 81 to an initial value, such as a count of zero. The bell is dropped off zero. The operator initiates the proof test by depressing any key on the keyboard 29a of the user interface unit 29. The processor 28 responsively generates a RESET signal (FIG. 5, line D) on output 28b which resets the 7-bit counter 85 and the data latch 87 of the start pulse generating circuit 83.

The start valve 24 is then opened allowing the test bell 13 to begin its descent. Once the circuits have been initialized, and the bell is released, the encoder 22 generates pulses indicative of the rotation of the shaft 16a as the test bell descends. As the test bell descends, the pulse detecting circuit 25 monitors the signal output (FIG. 5, lines A and B) of the encoder and generates the 2 cubic foot ENABLE signal (FIG. 5, line E) when the encoder pulse count reaches 8448 for instance.

Figure 5:
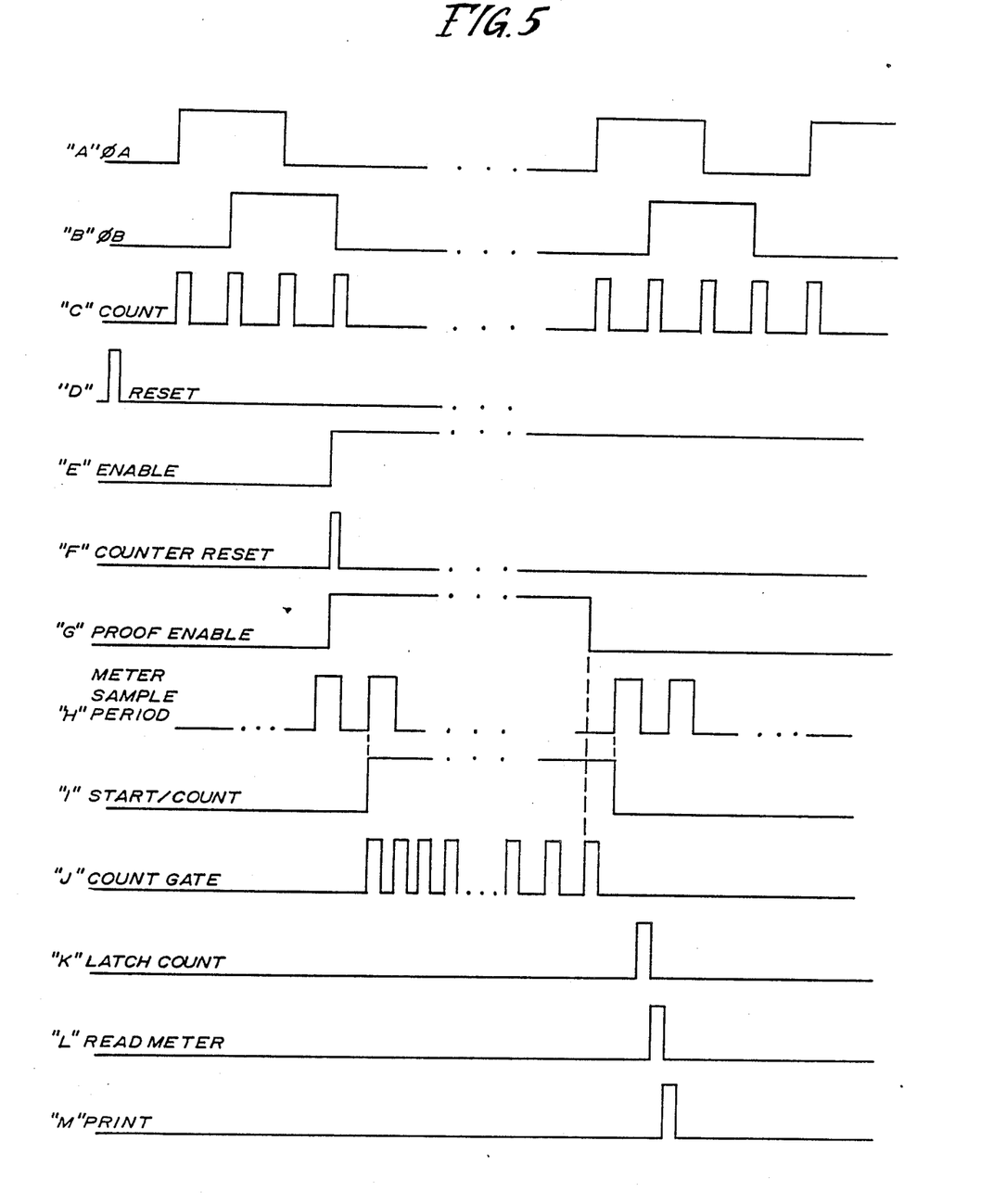
FIG. 5 is a timing diagram illustrating the relationship of signals of the test circuit and electronic meter during a proving operation.

Referring to FIGS. 4 and 5, the decoding circuit 81 receives the pulses generated by the encoder 22 (FIG. 5, lines A and B) and provides an eight bit output on outputs word D0–D7 representing the running count for the number of pulses generated by the encoder 22. The comparator circuit 89 generates an output for each 256 counts generated by the encoder. The 7-bit counter 85 responds to the outputs of the comparator circuit 89 to register the number of times that the output of comparator circuit 89 rolls over. The counter 86 is programmed to respond to outputs of the 7-bit counter 85 which corresponds to an encoder pulse count of 8448 ($33 \times 256$) to generate the 2 cubic foot ENABLE signal 28a (FIG. 5, line E).

Referring to FIGS. 3, 4 and 5, when the 2 cubic foot ENABLE signal (FIG. 5, line E) is generated, latch 87 is set. The processor 28 responds to the signal 2 foot ENABLE and generates signal PROOF ENABLE (FIG. 5, line G) to the meter circuit 41. At this time, the meter circuit 41 provides a START/COUNT ENABLE signal (FIG. 5, line I), inhibiting gate 30. On the start of the next meter sample period (FIG. 5, line H) meter circuit 41 enables gate 30 with the START/COUNT ENABLE signal, allowing volume counter 31 to begin counting encoder pulses, that represent the actual proving volume used for the test.

The meter now has its first reading, where the previous 31 samples are in the "sliding window". In the exemplary embodiment, thirty-two samples comprise a reading. The meter samples are stored in memory register 66-SAPL of the meter circuit (FIG. 3). The average of the samples constitutes the first reading. The average of these thirty-two samples is calculated by the meter processor 64, and the result, which is the first reading, is stored in the meter accumulator memory 66-ACC.

The meter circuit 41 continues accumulating readings until processor 28 detects the 3 cubic foot mark, indicated by a count of 4292 in volume flow counter 31, via lines 28d,e,g (FIG. 5, line J). Processor 28 signals meter circuit 41 by terminating the PROOF ENABLE signal on output 28h (FIG. 5, line G) and on the start of the next meter sample period (FIG. 5, line H), meter circuit 41 signals processor 28 by terminating the START COUNT ENABLE signal on output 28i, thus inhibiting gate 30. The processor applies signal LATCH to output 28e (FIG. 5, line K) to latch the count in the volume flow counter. Processor 28 then reads the actual proof volume used for the test from volume counter 331 via lines 28d, e, and g and also generates a read pulse (FIG. 5, line L) to read via serial lines 28j the measured flow volume data registered by meter circuit 41 which the meter circuit 41 has stored in accumulator memory 66-ACC.

The processor 28 compares actual proof volume to the results produced by meter circuit 41 to determine the percent proof, which is then displayed on the display 29b via serial port 28k (FIG. 5, line M). The processor 28 applies a signal PRINT (FIG. 5, line M) to the serial data port 28k for enabling the input/output terminal 29 to receive and display the percent proof.

What is claimed is:

1. A method for proof testing of an electronic gaseous fluid flow meter including a solid state fluid flow sensor and a signal processing circuit, the flow sensor of the meter providing a signal output indicative of fluid flow measured thereby, the signal processing circuit of the meter including timing means for generating periodically recurring timing signals defining sampling intervals for the meter, sampling means which samples the signal output of the fluid flow sensor during the sampling intervals to obtain flow measurement data representing the volume of fluid that has been passed through the meter, and memory means for storing the flow measurement data, the method comprising the steps of:

supplying to the meter under test a volume of a gaseous test fluid using a volume measurement standard apparatus;

generating an enabling signal for the signal processing circuit of the meter under test to cause the sampling means to start sampling the signal output of the fluid flow sensor during sampling intervals defined by the timing means and accumulating in the memory means of the meter measurement data representing the volume of test fluid measured by the meter in response to fluid flow through the meter during the sampling intervals;

generating a plurality of electrical pulses, the number of pulses generated being indicative of the actual volume of the test fluid which is passed through the meter during the test;

causing the signal processing circuit of the meter to enable a pulse counter to start registering the electrical pulses at the start of the first sampling interval during which the signal processing circuit of the meters starts sampling the signal output of the fluid flow sensor;

monitoring the pulse counter to determine when a preselected number of pulses has been registered by the pulse counter, the preselected number of pulses being indicative of a preselected volume of test fluid having been passed through the meter under test;

causing the meter to stop conducting fluid flow measurements when said preselected number of pulses has been registered by the pulse counter;

causing the signal processing circuit of the meter to disable the pulse counter at the start of the first sampling interval after the pulse counter registers said preselected number of pulses to stop the pulse counter from registering further pulses; and correlating measurement data stored in the memory means of the meter indicative of the volume of test fluid which is measured by the meter during the test with data representing the count registered by the pulse counter indicative of the actual volume of the test fluid passed through the meter during the test for proving the operation of the meter.

2. A method according to claim 1, which includes delaying the enabling of the signal processing circuit of the meter and the registering of the pulse count until the rate of fluid flow to the meter becomes substantially constant prior to measurement of the fluid flow volume through the meter.

3. A method according to claim 2, wherein delaying the enabling of the signal processing circuit of the meter includes generating a plurality of pulses registering the plurality of pulses for enabling the meter in a pulse counter, and generating an enabling signal when said pulse counter has registered a count corresponding to the number of said plurality of pulses.

4. A method according to claim 3, wherein the volume measurement standard apparatus comprises a bell prover including a test bell, and wherein measuring the volume of the test fluid which passes through the meter under test includes monitoring the position of the test bell using a position encoder means, the encoder means generating said electrical pulses to indicate the position of the bell as it moves from an initial position to a further position in measuring the actual volume of the test fluid supplied to the meter.

5. A method for proof testing of an electronic gaseous fluid flow meter of the type including a solid state fluid flow sensor and a signal processing circuit, the flow sensor of the meter providing a signal output indicative of fluid flow measured thereby, the signal processing circuit of the meter including timing means for generating periodically recurring timing signals defining sampling intervals for the meter, sampling means which samples the signal output of the fluid flow sensor during the sampling intervals to obtain flow measurement data representing the volume of fluid that has been passed through the meter, and memory means for storing the flow measurement data, the method comprising the steps of:

supplying to the meter under test a volume of a test fluid using a bell prover apparatus including a test bell which moves between first and second positions in supplying a volume of test fluid to the meter under test;

generating an enabling signal for the signal processing circuit of the meter to cause the sampling means to start sampling the signal output of the fluid flow sensor during sampling intervals defined by the timing means and accumulating in the memory means of the meter data representing the meter volume flow measurement data obtained for the meter during the sampling intervals;

generating a plurality of electrical pulses, the number of pulses generated being indicative of the actual volume of the test fluid supplied to the meter by the test bell during movement of the test bell between positions;

causing the signal processing circuit of the meter to enable a pulse counter to start registering the electrical pulses at the start of the first sampling interval during which the signal processing circuit starts sampling the signal output or the fluid flow sensor;

monitoring the pulse counter to determine when the pulse counter has registered a preselected number of pulses, the preselected number of pulses being indicative of a preselected volume of test fluid having been passed through the meter under test;

disabling the signal processing circuit of the meter to cause the sampling means to stop sampling the signal output of the fluid flow sensor when said preselected number of pulses has been registered by the pulse counter;

causing the signal processing circuit of the meter to disable the pulse counter at the start of the first sampling interval occurring after the pulse counter registers said preselected number of pulses to stop the pulse counter from registering further pulses, deriving from the pulse count registered by the pulse counter volume flow data representing the actual volume of test fluid which is passed through the meter during the test; and correlating the actual volume flow data derived from the pulse counter with the meter volume flow measurement data stored in the memory means of the meter in proving the operation of the meter.

6. A method according to claim 5, which includes delaying the enabling of the signal processing circuit for a time interval following movement of the test bell away from said first position.

7. A method according to claim 6, wherein generating the electrical pulses includes using an encoder means to monitor the displacement of the test bell from its first position to its second position and wherein delaying the enabling of the signal processing circuit includes registering in a further pulse counter electrical pulses generated by said encoder means and generating a signal for enabling the signal processing circuit when a preselected number of pulses have been registered.

8. Apparatus for proof testing of an electronic gaseous fluid flow meter including a solid state fluid flow sensor and a signal processing circuit, the flow sensor of the meter providing a signal output indicative of fluid flow measured thereby, the signal processing circuit of the meter including timing means for generating periodically recurring timing signals defining sampling intervals for the meter, sampling means which samples the signal output of the fluid flow sensor during the sampling intervals to obtain flow measurement data representing the volume of fluid that has been passed through the meter, and memory means for storing the flow measurement data, the apparatus comprising:

means including a volume measurement standard apparatus for supplying to the meter under test a volume of a gaseous test fluid;

control means for generating an enabling signal for enabling the signal processing circuit of the meter under test to cause the sampling means to start sampling the signal output of the fluid flow sensor during sampling intervals defined by the timing means and accumulating in the memory means volume flow measurement data representing the volume of test fluid measured by the meter in response to fluid flow through the meter;

pulse generating means associated with said volume measurement standard apparatus for generating a plurality of electrical pulses, the number of pulses generated being indicative of the actual volume of the test fluid which is passed through the meter during a test;

pulse counting means coupled to said pulse generating means and enabled by the signal processing means of the meter in response to the generation of the timing signal which defines the first sampling interval for the processing circuit, to start registering the electrical pulses generated by said pulse generating means;

said control means being coupled to said pulse counting means and responding to said pulse counting means to terminate said enabling signal to disable the signal processing circuit of the meter to thereby cause the meter to stop conducting fluid flow measurements when the pulse counting means has registered a preselected number of pulses indicative of a preselected volume of test fluid having been passed through the meter under test; and the signal processing circuit of the meter responsively disabling said pulse counting means at the start of the first sampling interval after said pulse counting means registers said preselected number of pulses to stop said pulse counting means from registering further pulses;

said control means correlating measurement data stored in the memory means of the meter indicative of the volume of test fluid which is measured by the meter during said test with data representing the count registered by said pulse counting means indicative of the actual volume of the test fluid passed through the meter for proving the operation of the meter.

9. Apparatus according to claim 8, which includes delay means for delaying the enabling of the signal processing circuit of the meter for a time sufficient to allow the rate of fluid flow to the meter to become substantially constant prior to measurement of the fluid flow volume through the meter.

10. Apparatus according to claim 9, wherein said delay means includes a further pulse counting means coupled to said pulse generating means for registering pulses generated by said pulse generating means and means for generating said enabling signal when said further pulse counting means has registered a given number of pulses.

11. Apparatus according to claim 8, wherein said volume measurement standard apparatus comprises a bell prover mean including a test bell, and wherein said pulse generating means comprises encoder means, said encoder means being coupled to said test bell for generating said electrical pulses to indicate the position of said bell as it moves from an initial position to a further position in measuring the actual volume of the test fluid supplied to the meter.

12. Apparatus for use in proving an electronic gaseous fluid flow meter of the type including a solid state fluid flow sensor and a signal processing circuit, the flow sensor of the meter providing a signal output indicative of fluid flow measured thereby, the signal processing circuit of the meter including timing means for generating periodically recurring timing signals defining sampling intervals for the meter, sampling means which samples the signal output of the fluid flow sensor during the sampling intervals to obtain flow measurement data representing the volume of fluid that has passed through the meter, and memory means for storing the flow measurement data, the apparatus comprising:

a bell prover means having a test bell which moves between first and second positions in supplying a volume of test fluid to the meter under test;

encoder means associated with the test bell for generating electrical pulses, the number of pulses generated being indicative of the volume of test fluid supplied to the meter under test by the test bell as the test bell moves between the first and second positions during a test;

pulse counting means coupled to said encoder means and operable when enabled to register the pulses generated by the encoder means;

control means for generating an enabling signal for enabling said signal processing circuit of the meter to cause the sampling means to start sampling the output of said fluid flow sensor during sampling intervals defined by the timing means as the test bell moves between said first and second positions to obtain flow measurement data representing the volume of fluid flow measured by the meter during the test and to accumulate the flow measurement data in the memory means;

said signal processing circuit of the meter responding to said enabling signal to enable said pulse counting means at the beginning of the first sampling interval to start registering the pulses generated by said encoder means, said control means being responsive to said pulse counting means registering a preselected number of pulses to terminate said enabling signal to disable the signal processing circuit of the meter and thereby cause said signal processing circuit of the meter to stop sampling the signal output of said fluid flow sensor and to disable said pulse counting means at the start of the first sampling interval after said pulse counting means registers said preselected number of pulses, whereby the pulse count registered by said pulse counting means is indicative of the actual volume of fluid flow through the meter during the sampling intervals that the signal processing circuit of the meter was enabled to sample the signal output of the fluid flow sensor;

said control means correlating the measurement data stored in the memory means of the meter which is indicative of the volume of test fluid which is measured by the meter during the sampling intervals with data representing the count registered by the pulse counting means which is indicative of the actual volume of the test fluid passed through the meter for proving the operation of the meter.

* * * * *